B. HARMON.
GATE.
APPLICATION FILED OCT. 13, 1910.
993,245.
Patented May 23, 1911.
2 SHEETS—SHEET 1.
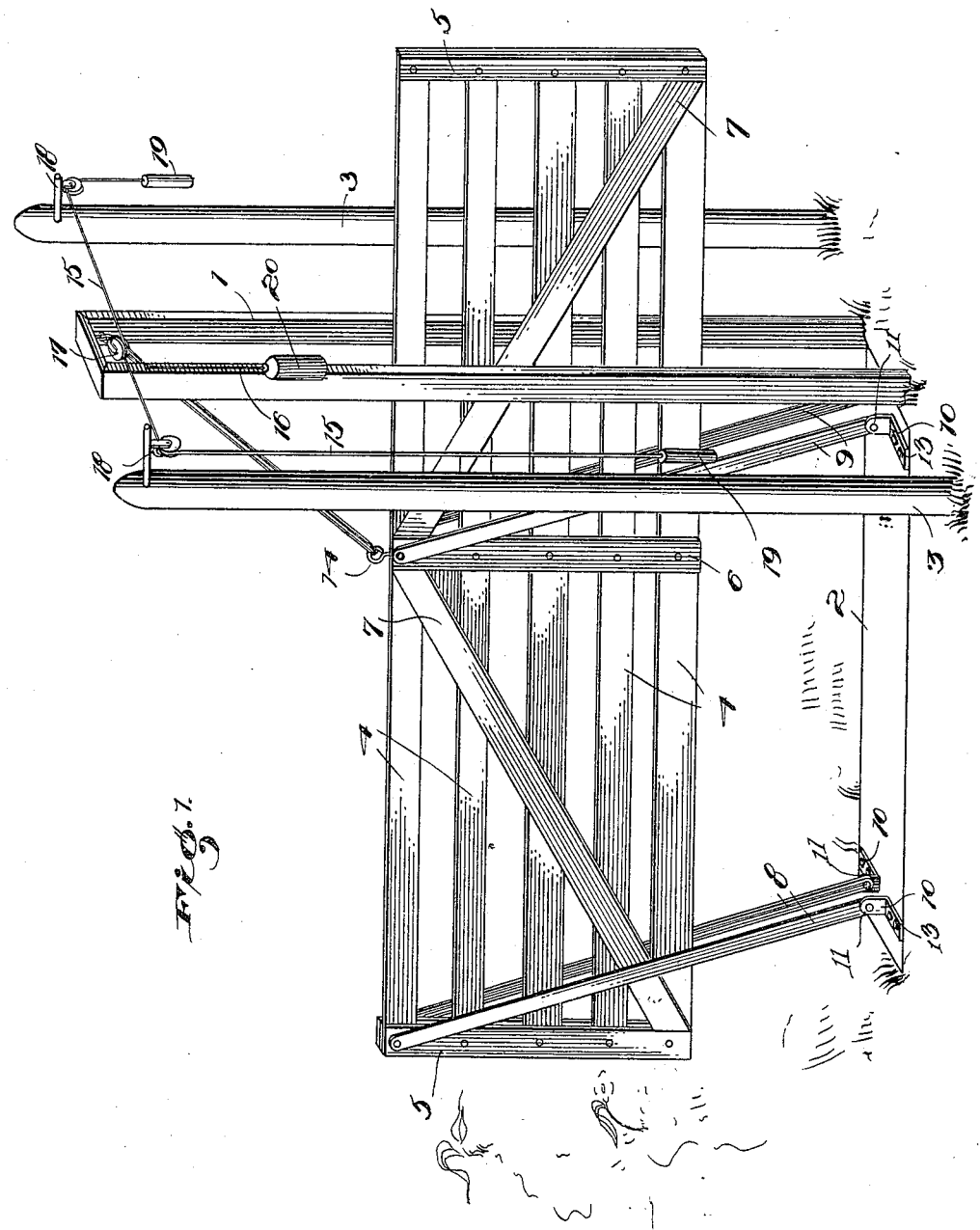
Witnesses
Inventor
Benson Harmon.
By E. E. Vrooman,
his Attorney.

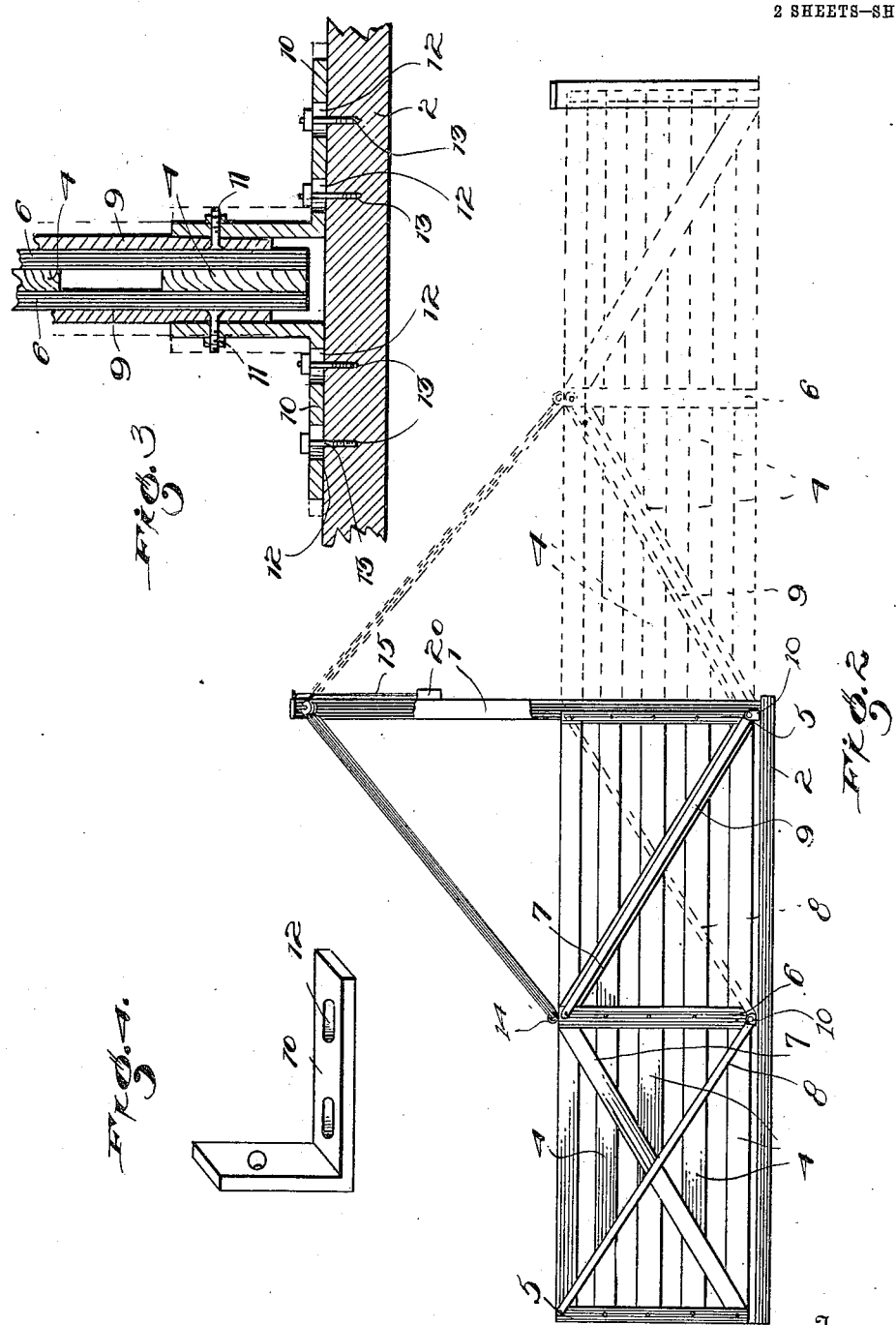

UNITED STATES PATENT OFFICE.

BENSON HARMON, OF TECUMSEH, NEBRASKA.

GATE.

993,245. Specification of Letters Patent. Patented May 23, 1911.

Application filed October 13, 1910. Serial No. 586,916.

*To all whom it may concern:*

Be it known that I, BENSON HARMON, a citizen of the United States, residing at Tecumseh, in the county of Johnson and State of Nebraska, have invented certain new and useful Improvements in Gates, of which the following is a specification, reference being had therein to the accompanying drawing.

This invention relates to gates, and the principal object of the same is to provide a gate which can be opened or closed from either side without getting out of a vehicle.

It is also desired to provide a gate which will not be interfered with by heavy snow or by the gate sagging.

This improved gate is illustrated in the accompanying drawings wherein:

Figure 1 is a perspective view of the gate showing the same as it would appear when half open or closed. Fig. 2 is a view partly in section and shows the gate in an open position in full lines, and indicates the closed position by dotted lines. Fig. 3 is a vertical sectional view of a portion of the gate showing how the same would appear when open. Fig. 4 is a perspective view of one of the brackets supporting the legs.

From the accompanying drawings it will be seen that the improved gate comprises a vertical rectangular frame 1 which is firmly secured into the ground and to the rear thereof there is sunk a base 2 which is preferably formed of hard wood. A vertical standard 3 is located to either side of the frame and firmly secured into the ground. The gate is formed of a plurality of longitudinal bars 4 which are connected by means of end and center braces 5 and 6. The usual diagonal braces 7 are provided between the braces 5 and 6. This gate is of the ordinary construction used in making pannel gates. The gate is mounted upon two pairs of legs 8 and 9 which are pivotally secured one to each side of one of the end braces 5 and the center brace 6 so that the gate can pass between them. The legs are approximately twice the length of the width of the gate and at their lower ends are pivotally mounted upon the angle brackets 10 by means of the bolts 11 or other desired devices. The brackets are provided with longitudinal slots 12 through which the securing bolts 13 pass. The brackets are provided with the slots 12 so that the legs 8 and 9 can be adjusted to the thickness of the gate as shown by the dotted lines in Fig. 3.

A screw-eye 14 is secured at the center of the upper bar 4 and to it are secured a number of ropes 15 and 16. The ropes are carried up and passed over a pulley 17 secured to the upper portion of the frame 1. The ropes 15 are here carried one to each side and passed over pulleys 18 carried by the standards 3.

A hand grip 19 is secured to the end of each of the ropes 15. It may, if desired, be in the form of a weight to help balance the gate when operating the same. The rope 16 is carried to one side and passed through an eye fastened to the side of the frame 1. A heavy weight 20 is secured to the end of the rope 16 and is for the purpose of balancing the gate when opening or closing the same.

The operation of the device is as follows:—Assuming that the gate is open as shown by the solid lines in Fig. 2 and it is desired to close the gate one of the hand grips 19 is grasped and the rope 15 pulled. This raises the gate as shown in Fig. 1 and moves it forward through the frame 1 until it is moved far enough for its weight to bring it down and close the gate as shown by the dotted lines in Fig. 2. The weight 20 aids the operator in raising the gate and also keeps the gate from coming down with too much of a jar. When it is desired to open the gate the operation is the same as when closing it. The gate can be opened and closed from either side.

What I claim is:

A gate mechanism comprising a vertical frame, a standard to each side of said frame, pulleys secured to said frame and standards, a gate positioned to pass through said frame, said gate comprising a plurality of longitudinal bars, a vertical bar at each end of said longitudinal bars, a vertical bar at the middle of said longitudinal bars, a diagonal brace secured at each lower corner of said gate, and having their upper ends secured to the central portion of said gate adjacent said central vertical bar, a pair of supporting legs pivotally connected with the upper portion of one of said end bars, a second pair of legs pivotally connected with the upper end of said central bar, said legs pivotally mounted upon a base, a screw-eye positioned in said gate in alinement with said central bar, operating cables passing through said pulleys and secured to said screw eye, and a counter-weight connected with said screw eyes and said frame.

In testimony whereof I hereunto affix my signature in presence of two witnesses.

BENSON HARMON.

Witnesses:
E. F. PERKINS,
MOSES LANGLEY.

Copies of this patent may be obtained for five cents each, by addressing the "Commissioner of Patents, Washington, D. C."